(12) United States Patent
Wu

(10) Patent No.: US 8,326,935 B2
(45) Date of Patent: *Dec. 4, 2012

(54) GROUP LIST EXCLUSIONS FOR MESSAGING

(75) Inventor: Jingsong Wu, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/987,651

(22) Filed: Jan. 10, 2011

(65) Prior Publication Data

US 2011/0106901 A1 May 5, 2011

Related U.S. Application Data

(63) Continuation of application No. 11/471,676, filed on Jun. 21, 2006, now Pat. No. 7,882,184.

(51) Int. Cl.
*G06F 15/16* (2006.01)
(52) U.S. Cl. ....................................................... 709/206
(58) Field of Classification Search ................... 709/206
See application file for complete search history.

(56) References Cited

U.S. PATENT DOCUMENTS

| | | | |
|---|---|---|---|
| 6,721,785 B1 * | 4/2004 | Raghunandan | 709/206 |
| 2003/0061289 A1 | 3/2003 | Clissold et al. | |
| 2004/0093382 A1 | 5/2004 | Kulkarni | |
| 2005/0010645 A1 * | 1/2005 | Arshi et al. | 709/207 |
| 2006/0168068 A1 | 7/2006 | Ziegert | |

OTHER PUBLICATIONS

"Requirements for Internet Hosts—Application and Support, Internet standard", Braden, R., Ed, "Requirements for Internet Hosts—Application and Support, Internet standard," RFC 1123, Oct. 1989. (92 pages), published by the Internet Society of Reston, VA, and available at http://www.ietf.org/rfc/rfc1123.txt.
Freed, et al., "Multipurpose Internet Mail Extensions (MIME) Part Five: Conformance Criteria and Examples", Freed, N. and N. Borenstein, "Multipurpose Internet Mail Extensions (MIME) Part Five: Conformance Criteria and Examples", RFC 2049, Nov. 1996. (22 pages) published by the Internet Society of Reston, VA, and available at http://www.ietf.or!=j/rfc/rfc204.
Freed, et al., "Multipurpose Internet Mail Extensions (MIME) Part Four: Format of Internet Message Bodies", Freed, N., Klensin, J. and Postel, J., "Multipurpose Internet Mail Extensions (MIME) Part Four: Format of Internet Message Bodies", RFC 2048, Nov. 1996. (19 pages), published by the Internet Society of Reston, VA, and available at http://www.ietf.or!=1.
Freed, et al , "Multipurpose Internet Mail Extensions (MIME) Part One: Format of Internet Message Bodies", Freed, N. and N. Borenstein, "Multipurpose Internet Mail Extensions (MIME) Part One: Format of Internet Message Bodies", RFC 2045, Nov. 1996. (28 pages), published by the Internet Society of Reston, VA, and available at http://www.ietf.org/rfc/rfc2045.
Freed, et al., "Multipurpose Internet Mail Extensions (MIME) Part Two: Media Types", Freed, N. and N. Borenstein, "Multipurpose Internet Mail Extensions (MIME) Part Two: Media Types", RFC 2046, Nov. 1996. (40 pages), published by the Internet Society of Reston, VA, and available at http://www.ietf.or!=j/rfc/rfc2046.txt.

(Continued)

*Primary Examiner* — George C Neurauter

(57) ABSTRACT

A message is received comprising a recipient list and an exclusion list. Recipients in the recipient list are identified, as are recipients in the exclusion list. A recipient is removed from the recipient list based on an identification of the recipient in the exclusion list.

23 Claims, 2 Drawing Sheets

OTHER PUBLICATIONS

Klensin, "Simple Mail Transfer Protocol", Klensin, J., Ed., "Simple Mail Transfer Protocol", RFC 2821, Mar. 2001. (71 pages), published by the Internet Society of Reston, VA, and available at http://www.ietf.org/rfc/rfc2821.txt.

Moore, "Multipurpose Internet Mail Extensions (MIME) Part Three: Message Header Extensions for Non-ASCII Text", Moore, K., RFC 2047, Nov. 1996. (14 pages), published by the Internet Society of Reston, VA, and available at http://www.ietf.org/rfc/rfc2047.txt.

Postel, "Simple Mail Transfer Protocol", Postel, J., "Simple Mail Transfer Protocol," RFC 821, Aug. 1982, (65 pages), published by the Internet Society of Reston, VA, and available at http://www.ietf.org/rfc/rfc821.txt.

Resnick, "Internet Message Format", Resnick, P., Ed., "Internet Message Format," RFC 2822, Apr. 2001, (46 pages), published by the Internet Society of Reston, VA, and available at http://www.ietf.org/rfc/rfc2822.txt.

* cited by examiner

US 8,326,935 B2

GROUP LIST EXCLUSIONS FOR MESSAGING

CROSS REFERENCE TO RELATED APPLICATIONS

This application is a continuation of U.S. patent application Ser. No. 11/471,676, filed on Jun. 21, 2006, which is hereby incorporated by reference in its entirety.

BACKGROUND INFORMATION

Sending and receiving email messages via a computer network such as the Internet has been known for a number of years. One widely used protocol for sending a receiving email messages is Simple Message Transfer Protocol (SMTP). SMTP is described in, for example, RFC 2821—Simple Mail Transfer Protocol, published by the Internet Society (2001), fully incorporated by reference herein in its entirety, and RFC 1123—Requirements for Internet Hosts—Application and Support, published by the Internet Society (1989), also fully incorporated by reference herein in its entirety. RFC 2821 and RFC 1123 are both also presently available on the World Wide Web from the faqs.org website. SMTP provides for the sender of an email message to specify the email addresses or addresses to which a mail message should be sent, e.g., in the "TO" field of an email message. SMTP further provides an "EXPN" command that allows for the specification of a distribution list stored on a mail server that includes a list of one or more addresses to which an email message should be sent.

Distribution lists and the like provide a convenient and efficient way to send e-mail messages to multiple recipients without having to provide a specific e-mail designation or address for each of the multiple recipients. However, the list of e-mail addresses in a distribution list often does not precisely match the list of recipients to whom a person sending an e-mail wishes to send the e-mail. For example, a distribution list in a corporate environment may include all persons working in a particular office. A sender wishing to invite persons in the office to a surprise party for one of the people working in the office would want to send an email message to everyone in the office except the guest of honor. Presently, such a sender would have to enter the name or email address of every person in the office except the guest of honor into the "TO" field of an email message. Entering such names or email addresses is cumbersome, time-consuming, and inefficient, particularly where the number of intended recipients is large. Further, particularly as the number of intended recipients grows, it is likely that the sender of an email message will inadvertently neglect to identify some of the intended recipients of an email message.

Accordingly, what is needed is a way for a sender to be able to specify recipients on a distribution list or other list of message recipients who should be excluded from receiving the message.

DETAILED DESCRIPTION OF THE PREFERRED EMBODIMENTS

Figures 1, 2:
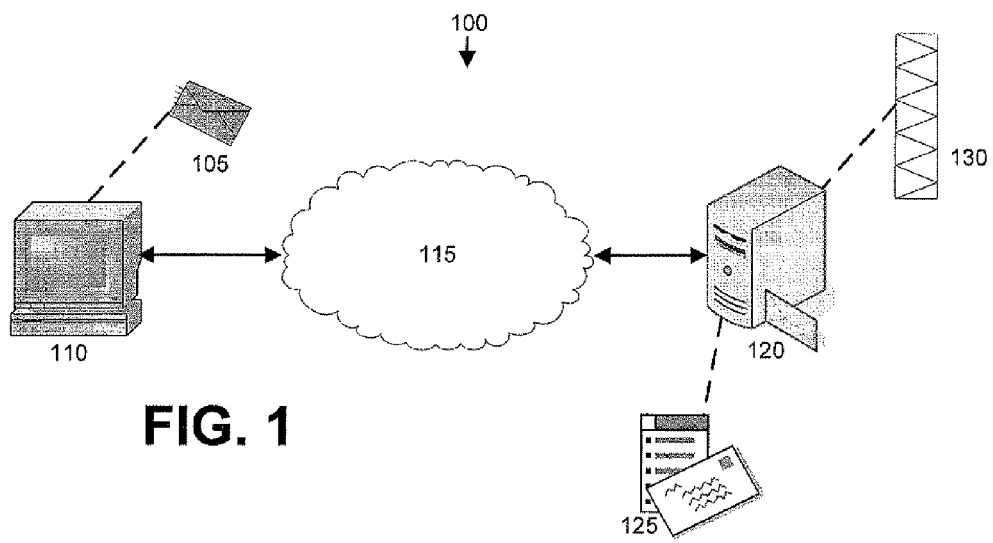
FIG. 1 illustrates a system for sending a message, according to an embodiment.
FIG. 2 illustrates a message, according to an embodiment.

FIG. 1 illustrates a system 100 for sending a message 105, according to an embodiment. In embodiments discussed herein, message 105 is an email message that is sent according to SMTP, although it is to be understood that embodiments using other email protocols are contemplated. Further, it is to be understood that message 105 need not be an email, but could be some other kind of electronic message such as an instant message.

Client 110 and server 120 are used to send message 105, generally via network 115. Client 110 and server 120, which are generally but not necessarily distinct computing devices, may each include any one of a number of known computing devices, including, without limitation, a computer workstation, a desktop, notebook, laptop, or handheld computer, or some other known computing device, such as a Java-enabled cellular telephone or similar device. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Client 110 and server 120 each include instructions executable by one or more computing devices such as those listed above. For example, client 110 generally comprises an email client software program such as Microsoft Outlook, provided by Microsoft Corporation of Redmond, Wash., or the like. Server 120 general comprises an SMTP server such as Microsoft Exchange Server, also provided by Microsoft Corporation. Further, some or all of process 300, described below with reference to FIG. 3, may be implemented as computer-executable instructions.

In general, computer-executable instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Network 115 may be any one of a number of known computer networks, including the Internet, a local area network (LAN), wide area network (WAN), etc.

Distribution list 125 is generally stored on server 120, and is generally identified by a name, e.g., "All," "Tokyo Office," "Sales Reps," etc., and comprises a list of names and/or addresses to which message 105 may be sent. As is known, clients for sending messages 105 such as email clients generally allow a user to specify recipients of messages 105 variously according to a name, e.g., "John Doe," or an address, e.g., "john@doe.com." Distribution list 125 may similarly include such names and/or addresses according to which intended or potential recipients of messages 105 may be identified.

Filter 130 comprises instructions for removing names or addresses from distribution list 125 prior to sending message 105. Such names or addresses to be removed from distribution list 125 may be specified individually, or may be specified as one or more second distributions lists 125. For example, in one embodiment, SMTP is modified to include an "EXCL" command, which tells server 120 that filter 130 should be invoked. When the EXCL command or some similar command is sent from client 110 to server 120, filter 130 removes specified addresses from the list of recipients for message 105 prior to sending message 105.

FIG. 2 illustrates a message 105, according to an embodiment. Message 105 includes date field 205, recipient description field 210, sender description field 215, and subject field 225, as well as message body 230. Message 105 further includes exclude field 220, which may be used to provide names, addresses, or distribution lists 125 to be excluded from a distribution list 125 provided in recipient description field 210. Accordingly, filter 130 may comprise instructions for removing recipients identified in exclude field 220 from a list of recipients provided in recipient description field 210.

Figure 3:
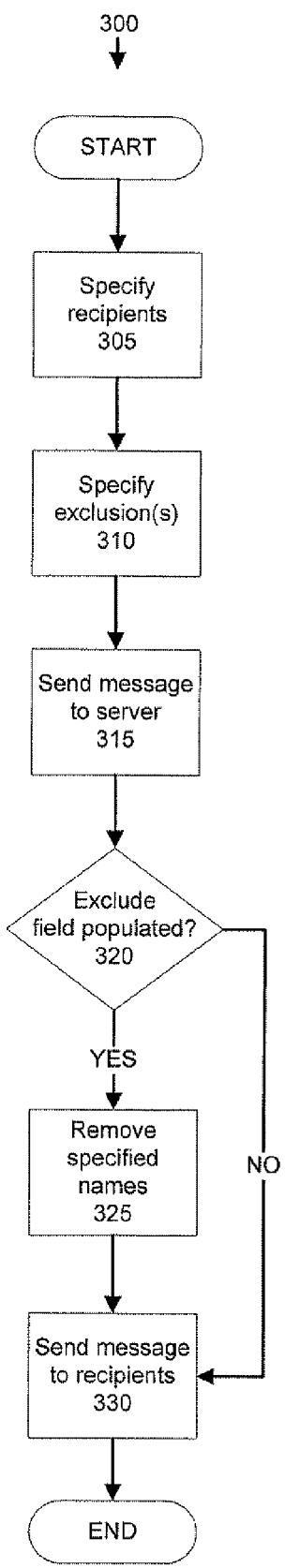
FIG. 3 illustrates a process for sending a message, according to an embodiment.

FIG. 3 illustrates a process 300 for sending a message 105, according to an embodiment. It is to be understood that, in addition to, or along with, the steps described with reference to process 300, known steps for processing messages 105 using SMTP or other protocols will generally be executed. For example, process 300 may be implemented as computer-executable instructions on client 110 and/or server 120 that are executed along with or as part of other computer-executable instructions for sending and/or receiving messages 105.

In step 305, recipients for a message 105 are specified at client 110, e.g., by a user specifying recipient names and/or addresses, or a distribution list 125 in recipient description field 210. Generally such recipients are provided through a graphical user interface (GUI) in a client software program such as Microsoft Outlook® or the like, although embodiments are possible in which messages 105 may be populated and sent automatically from a computer program without the intervention of a human user. Further, generally names and/or addresses are included in recipient description field 210 by way of their inclusion in distribution list 125, but it is also possible to provide names and addresses directly in recipient description field 210 at client 110.

Next, in step 310, names and/or addresses to be excluded from receipt of message 105 are specified at client 110 in exclude field 220. Generally names and/or addresses are included by themselves and not as part of distribution list 125, but it is to be understood that exclude field 220 may be populated with distribution list 125 instead of or in addition to names and/or addresses.

Next, in step 315, message 105 is sent from client 110 to server 120, e.g., by a user selecting a "send" button or the like in a GUI in a client program such as Microsoft Outlook, a web page for sending emails, etc. However, as noted above, embodiments are possible in which messages 105 are sent without the intervention of a human user, and without any display of message 105 in a GUI.

Next, in step 320, server 120 receives message 105 and determines whether exclude field 220 is present and populated, i.e., whether message 105 includes an exclude field 220 containing one or more names and/or addresses. If not, process 300 proceeds to step 330. Otherwise, step 325 is next executed.

In step 325, server 120 removes names and/or addresses provided in exclude field 220 from the list of names and/or addresses provided in recipient description field 210, e.g., in distribution list 125 in recipient description field 210. It should be understood that step 325 may be performed in the context of known processing of SMTP messages. For example, it should be understood that, upon receiving message 105 from client 110, where distribution list 125 is present in message 105, server 120 will execute an SMTP "EXPN" command to replace distribution list 125 with a list of names and/or addresses to receive message 105. Once the EXPN command has been executed, it is then possible, in step 325, to remove the names and/or addresses provided in exclude field 220 from the list of recipients to which server 120 will send message 105, e.g., by using an "EXCL" command or the like to apply filter 130, as described above.

It is possible that a distribution list 125 in recipient description field 210 will include one or more other distribution lists 125 where such other distribution lists 125 are stored on a server other than server 120. Server 120 generally cannot resolve such distribution lists 125 to a list of individual recipients for message 105, because the host server for the other distribution lists 125 is required to resolve the other distribution lists 125 to a list of individual recipients for message 105. Accordingly, in such situations, it is to be understood that server 120 may provide SMTP's EXPN command or the like to the server hosting a particular distribution list 125 in need of resolution, and that server 120 will then provide the EXCL command to the server hosting the distribution list 125 in need of resolution. Accordingly, the names and/or addresses specified in exclude field 220 may be excluded from receiving message 105 even if such names and addresses are included in a distribution list 125 stored on a server other than server 120.

Following step 325, step 330 is next executed. In step 330, server 120 sends message 105 to listed recipients as specified in the protocol according to which server 120 is programmed, e.g., SMTP.

Following step 330, process 300 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a server comprising a memory device, said server configured to:
   receive a recipient list specifying a list of recipients to receive a message, the recipient list including a name specifying a first distribution list, the first distribution list in turn including a name specifying a second distribution list stored on a second server;
   receive an exclusion command, the exclusion command specifying recipients to be excluded from receiving the message even if specified in the recipient list, thereby creating an exclusion list; and
   provide the exclusion command from the server to the second server, the exclusion command configured to cause the second server to filter recipients in the recipient list to exclude recipients also in the exclusion list.

2. The system of claim 1, wherein the server is further configured to store at least one distribution list, each distribution list being identified by name and specifying a group of potential recipients of a message.

3. The system of claim 1, wherein the server is a Simple Mail Transfer Protocol (SMTP) server, and the exclusion command is implemented as an extension to SMTP.

4. The system of claim 3, wherein the second server is an SMTP server.

5. The system of claim 1, further comprising a client configured to:
   send the recipient list to the server, and
   send a body of the message to the server.

6. The system of claim 1, wherein the recipient list further includes at least one of a name of an intended recipient of the message, and an address of an intended recipient of the message.

7. The system of claim 1, wherein the exclusion list further includes at least one of a name of an intended recipient of the message, and an address of an intended recipient of the message.

8. The system of claim 1, wherein the message is an e-mail message.

9. A method, comprising:
   receiving, at a server, a recipient list specifying a list of recipients to receive a message, the recipient list including a name specifying a first distribution list, the first distribution list in turn including a name specifying a second distribution list stored on a second server;
   receiving an exclusion command at the server, the exclusion command specifying recipients to be excluded from receiving the message even if specified in the recipient list, thereby creating an exclusion list; and
   providing the exclusion command from the server to the second server, the exclusion command causing the second server to filter recipients in the recipient list to exclude recipients also in the exclusion list.

10. The method of claim 9, further comprising sending the message to the list of recipients filtered to exclude recipients also in the exclusion list.

11. The method of claim 9, further comprising storing, by a server, at least one distribution list, each distribution list being identified by name and specifying a group of potential recipients of a message.

12. The method of claim 9, wherein the server is an SMTP server and the exclusion command is implemented as an extension to SMTP.

13. The method of claim 9, further comprising a client configured to:
    send the recipient list to the server, and
    send a body of the message to the server.

14. The method of claim 9, wherein the recipient list further includes at least one or a name of an intended recipient of the message, and an address of an intended recipient of the message.

15. The method of claim 9, further comprising:
    filtering, by the second server in response to the exclusion command, recipients in the recipient list to exclude recipients also in the exclusion list; and
    sending the message from the second server to the list of recipients filtered to exclude recipients also in the exclusion list.

16. The method of claim 9, further comprising:
    receiving a second recipient list specifying recipients to receive a second message;
    receiving a second exclusion command specifying recipients to be excluded from receiving the second message even if specified in the second recipient list; and
    filtering recipients in the second recipient list to exclude recipients also in the second exclusion list.

17. The method of claim 9, further comprising:
    determining whether the distribution list is hosted by a remote computing device;
    providing an expansion command to the remote computing device hosting the distribution list; and
    receiving an expansion of the list of potential recipients included in the distribution list from the remote computing device in response to the expansion command.

18. A non-transitory computer readable medium storing a software program, the software program being executable to provide operations comprising:
    receiving, at a server, a recipient list specifying a list of recipients to receive a message, the recipient list including a name specifying a first distribution list, the first distribution list in turn specifying a second distribution list stored on a second server;
    receiving an exclusion command, the exclusion command specifying recipients to be excluded from receiving the message even if specified in the recipient list, thereby creating an exclusion list; and
    providing the exclusion command to the second server, the exclusion command configured to cause the second server to filter recipients in the recipient list to exclude recipients also in the exclusion list in response to the exclusion command.

19. The computer readable medium of claim 18, wherein the operations further comprise storing at least one distribution list, each distribution list being identified by name and specifying a group of potential recipients of a message.

20. The computer readable medium of claim 18, wherein the operations further comprise receiving a body of the message to be sent to the list of recipients filtered to exclude recipient also in the exclusion list.

21. The computer readable medium of claim 18, wherein the operations further comprise implementing the exclusion command as an extension to SMTP.

22. The computer readable medium of claim 18, wherein the operations further comprise:

receiving a second recipient list specifying recipients to receive a second message;
receiving a second exclusion command specifying recipients to be excluded from receiving the second message even if specified in the second recipient list; and
filtering recipients in the second recipient list to exclude recipients also in the second exclusion list.

23. The computer readable medium of claim 18, wherein the operations further comprise sending the second message to the second list of recipients filtered to exclude recipients also in the second exclusion list.

\* \* \* \* \*